US008272290B2

(12) United States Patent
Zhang et al.

(10) Patent No.: US 8,272,290 B2
(45) Date of Patent: Sep. 25, 2012

(54) PARALLEL ROBOT

(75) Inventors: Guo-Qing Zhang, Shenzhen (CN); Zhi-Ming Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 434 days.

(21) Appl. No.: 12/647,656

(22) Filed: Dec. 28, 2009

(65) Prior Publication Data

US 2011/0113914 A1    May 19, 2011

(30) Foreign Application Priority Data

Nov. 19, 2009  (CN) .......................... 2009 1 0310013

(51) Int. Cl.
  *B25J 17/00*  (2006.01)
  *B25J 17/02*  (2006.01)
  *B25J 18/00*  (2006.01)
(52) U.S. Cl. .................. 74/490.01; 74/490.03
(58) Field of Classification Search ............... 74/490.01, 74/490.03, 490.05
See application file for complete search history.

(56) References Cited

U.S. PATENT DOCUMENTS

| | | | | |
|---|---|---|---|---|
| 6,516,681 | B1 * | 2/2003 | Pierrot et al. | 74/490.01 |
| 6,543,987 | B2 * | 4/2003 | Ehrat | 414/735 |
| 2004/0123694 | A1 * | 7/2004 | Negri | 74/490.01 |
| 2005/0092121 | A1 * | 5/2005 | Huang et al. | 74/490.01 |
| 2009/0260473 | A1 * | 10/2009 | Gosselin | 74/490.05 |
| 2009/0301253 | A1 * | 12/2009 | Nishida et al. | 74/490.01 |
| 2010/0206120 | A1 * | 8/2010 | Kinoshita et al. | 74/490.06 |
| 2011/0100145 | A1 * | 5/2011 | Feng | 74/490.01 |
| 2011/0132131 | A1 * | 6/2011 | Worz | 74/490.05 |

* cited by examiner

*Primary Examiner* — Justin Krause
(74) *Attorney, Agent, or Firm* — Altis Law Group, Inc.

(57) ABSTRACT

A parallel robot includes a base plate, two first actuators located on the base plate, a mobile platform, and two kinematic chains respectively interconnecting the base plate and the mobile platform. Each kinematic chain includes a driving bar assembly and a driven bar assembly. The driving bar assembly is connected to one of two first actuators. The driving bar includes two substantially parallel first transmission bars. Each of the first transmission bars includes a rotating portion rotatably connected to the base plate. The driven bar assembly interconnects the driving bar assembly and the mobile platform. Each of the two first actuators rotates two rotating portions of the two first transmission bars in the same direction simultaneously.

12 Claims, 3 Drawing Sheets

PARALLEL ROBOT

BACKGROUND

1. Technical Field

The present disclosure relates to robots and, particularly to a parallel robot.

2. Description of Related Art

Parallel robots with two or three degrees of freedom are well suited for simple tasks, such as packaging and assembly, and provide advantages over more complex series robots such as, for example, with six degrees of freedom, in reference to simplicity, price, and speed.

A commonly used parallel robot includes a base plate, a mobile platform, and two kinematic chains operated by two actuators fixed to the base plate. Each kinematic chain is made up of two bars linked at their ends. Each kinematic chain interconnects the mobile platform and the base plate.

However, often, the parallel robot has a relatively low motion stability substantially perpendicular to a movable plane of the kinematic chains.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
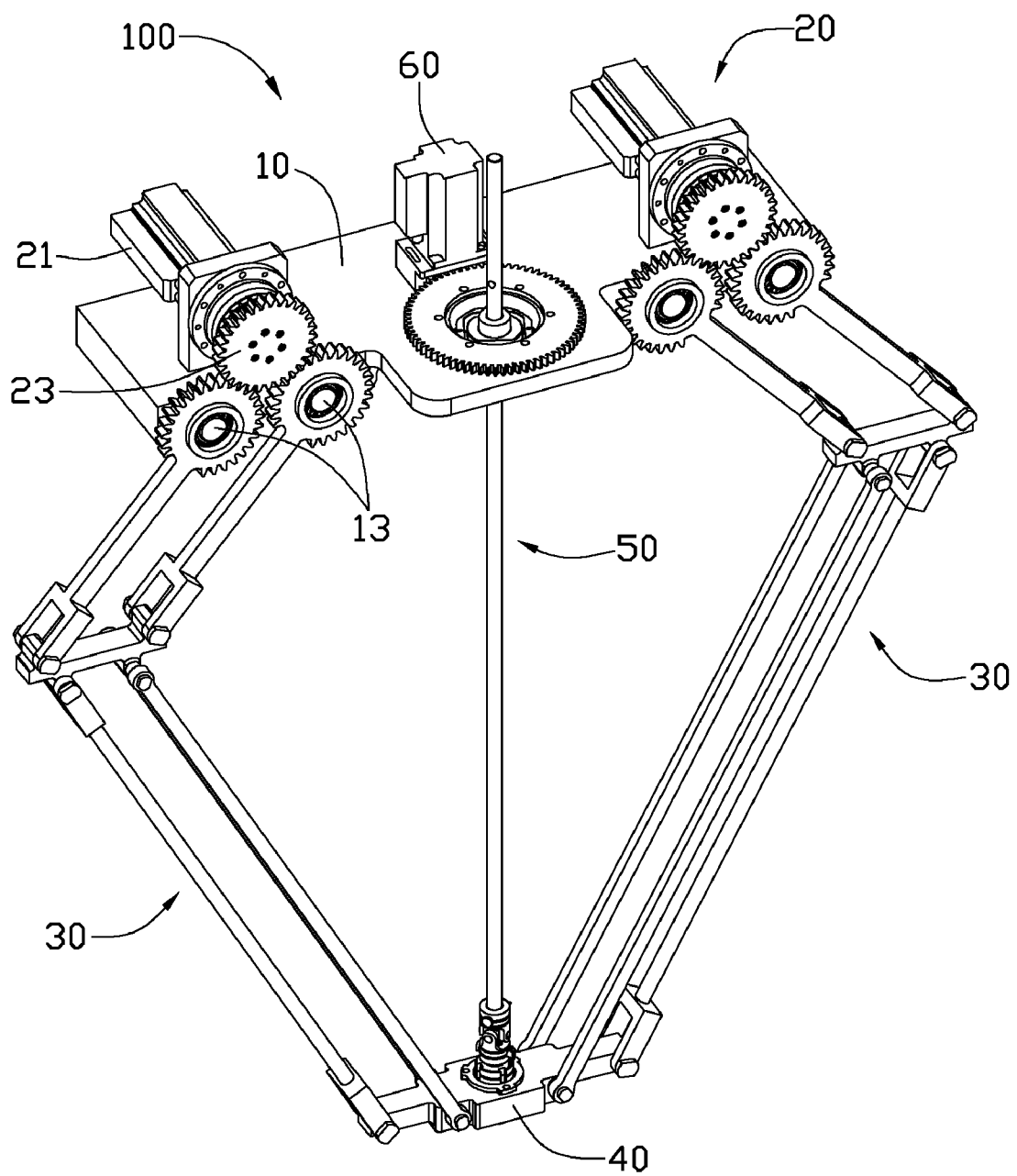
FIG. 1 is an assembled, isometric view of an embodiment of a parallel robot, including a kinematic chain.
Figure 2:
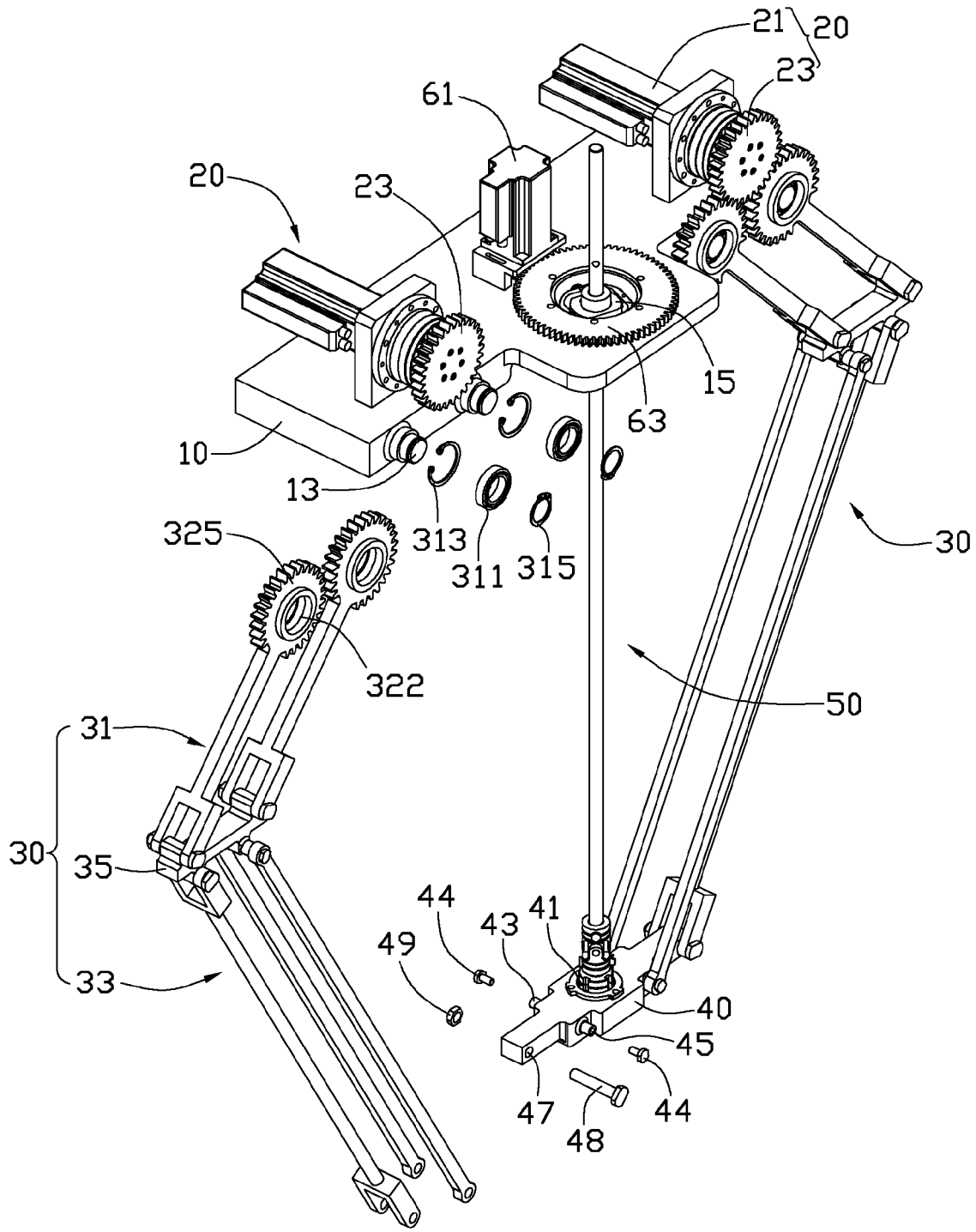
FIG. 2 is a partially disassembled, isometric view of the parallel robot in FIG. 1.

Referring to FIGS. 1 and 2, an embodiment of a parallel robot 100 includes a base plate 10, two first actuators 20, a second actuator 60, a mobile platform 40, two kinematic chains 30 and a rotary linkage shaft 50. The two first actuators 20 and the second actuator 60 are located on the base plate 10. Each of the two kinematic chains 30 is rotatably connected to the corresponding first actuator 20. The rotary linkage shaft 50 is rotatably connected to the second actuator 60. The second actuator 60 rotates the rotary linkage shaft 50 relative to the base plate 10.

The base plate 10 is substantially rectangular and includes four rotary shafts 13. The four rotary shafts are arranged in pairs, and extend outwardly from a side surface of the base plate 10. The base plate 10 defines a circular mounting hole 15 in a middle portion thereof.

Each first actuator 20 includes a rotational motor 21 and a gear 23 rotatably connected to the rotational motor 21. Each first actuator 20 is located on a top surface of the base plate 10 and the gear 23 is adjacent to the corresponding two rotary shafts 13. A distance between an axis of the gear 23 and an axis of one of the two rotary shafts 13 equals that between the axis of the gear 23 and an axis of another adjacent rotary shaft 13. The distance between the axis of the gear 23 and the axis of one of the two rotary shafts 13 is shorter than that between the two axes of the two rotary shafts 13.

Each kinematic chain 30 includes a driving bar assembly 31, a driven bar assembly 33, and a connecting plate 35 interconnecting the driving bar assembly 31 and the driven bar assembly 33.

Figure 3:
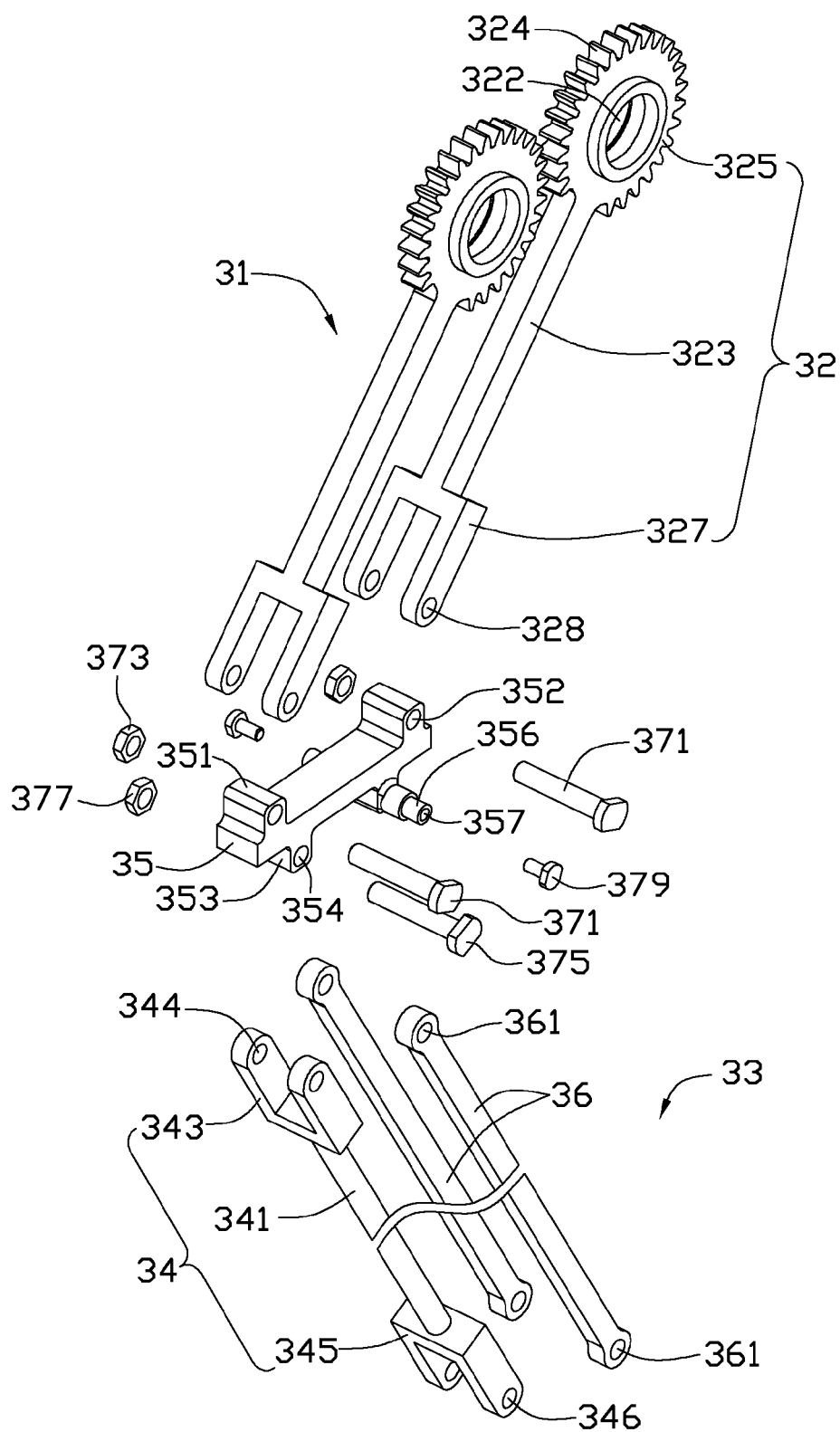
FIG. 3 is a disassembled, isometric view of the kinematic chain of the parallel robot shown in FIG. 2.

Referring to the FIG. 3, the driving bar assembly 31 includes two parallel first transmission bars 32 defining a plane substantially parallel to a movable plane of the kinematic chain 30. Each first transmission bar 32 includes a main body 323, a rotating portion 325, and a connecting portion 327. The rotating portion 325 and the connecting portion 327 respectively extend from opposite ends of the main body 323.

The rotating portion 325 is substantially disk-shaped, and defines a shaft hole 322 in a middle portion to receive the rotary shaft 13. Referring to the FIG. 2, the kinematic chain 30 further includes a bearing 311 in the shaft hole 322. The bearing 311 is sleeved on the rotary shaft 13, such that the rotating portion 325 can rotate relative to the rotary shaft 13. In order to prevent the rotating portion 325 from detaching from the rotary shaft 13, the kinematic chain 30 further includes a clasp 313 and clip spring 315 sleeved on the rotary shaft 13. The rotating portion 325 forms a dentate structure 324 on a margin meshing with the gear 23 of the first actuator 20.

The connecting portion 327 is substantially U-shaped, and defines two aligned connecting holes 328 adjacent to two free ends of the connecting portion 327.

The driven bar assembly 33 includes a second transmission bar 34 and two parallel third transmission bars 36. The second transmission bar 34 includes a main body 341, and a first swing portion 343 and second swing portion 345 extending from opposite ends of the main body 341. The first swing portion 343 is substantially U-shaped, and defines two aligned connecting holes 344 adjacent to two free ends of the first swing portion 343. The second swing portion 345 has the same shape as the first swing portion 343, and defines two aligned connecting holes 346.

Two third transmission bars 36 are the same length as the second transmission bar 34, and arranged in a plane substantially perpendicular to the movable plane of the kinematic chain 30. Each third transmission bar 36 defines two connecting holes 361 at opposite ends.

The connecting plate 35 is substantially rectangular, and forms two first connecting blocks 351 on a top surface facing the driving bar assembly 31. Each first connecting block 351 defines a pivot hole 352. The kinematic chain 30 further includes two first pivots 371 and two nuts 373. The first pivot 371 passes through one of the two connecting holes 328 of the first transmission bar 32, the pivot hole 352, another connecting hole 328, and engages the nut 373, such that the first transmission bar 32 is movably connected to the connecting plate 35.

The connecting plate 35 further forms two second connecting blocks 353 on a lower surface facing the driven bar assembly 33. One of the two second connecting blocks 353 defines a pivot hole 354, and the other second connecting block 353 forms a pair of supporting pivots 356 on opposite sidewalls. The pair of supporting pivots 356 is received in two connecting holes 361 of two third transmission bars 36. Each supporting pivot 356 defines a fixing hole 357 on a sidewall along its axis. The kinematic chain 30 further includes a second pivot 375, a nut 377, and two bolts 379. The second pivot 375 passes through one of the two connecting holes 344 of the second transmission bar 34, the pivot hole 354, the other connecting hole 344, and engages the nut 377, such that the second transmission bar 34 is movably connected to the connecting plate 35. The bolt 379 engages the fixing hole 357 after the supporting pivot 356 is received in the connecting hole 361, such that the third transmission bar 36 is movably connected to the connecting plate 35.

Referring to the FIG. 2 again, the mobile platform 40 is substantially rectangular, and defines a mounting hole 41 to receive the rotary linkage shaft 50 in a middle portion thereof. The mobile platform 40 includes four rotary pivots 43, arranged in pairs, extending outwardly from two side surfaces adjacent to the mounting hole 41. Each rotary pivot 43 defines a fixing hole 45 on an end surface along its axis. The rotary pivot 43 is received in the connecting hole 361 of the third transmission bar 36. In order to prevent the rotary pivot 43 from detaching from the connecting hole 361, the mobile platform 40 further includes four bolts 44. Each bolt 44 engages the fixing hole 45 after the rotary pivot 43 is received in the connecting hole 361, such that the third transmission bar 36 is movably connected to the mobile platform 40.

The mobile platform 40 defines two through holes 47 adjacent to opposite ends. The mobile platform 40 further includes two third pivots 48, and two nuts 49. The third pivot 48 passes through one of two connecting holes 346, the through hole 47, the other connecting hole 346, and engages the nut 49, such that the second transmission bar 34 is movably connected to the mobile platform 40.

The rotary linkage shaft 50 is rotatably connected to the base plate 10 with an end passing through the mounting hole 15, and is rotatably connected to the mobile platform 40 with the other end passing through the mounting hole 41.

The second actuator 60 includes a rotational motor 61, a driving gear (not labeled) connected to the rotational motor 61, and a driven gear 63 positioned adjacent to the mounting hole 15 meshing with the driving gear. The rotary linkage shaft 50 is movably connected to and able to rotate with the driven gear 63.

Referring to FIG. 3, during assembly of the kinematic chain 30, each of the two first pivots 371 passes through one of the two connecting holes 328 of the first transmission bar 32, the pivot hole 352, another connecting hole 328, and engages one nut 373, such that two first transmission bars 32 are movably connected to the connecting plate 35. Each of the two second pivot 375 passes through one of the two connecting holes 344 of the second transmission bar 34, the pivot hole 354, the other connecting hole 344, and engages one nut 377, such that the second transmission bar 34 is movably connected to the connecting plate 35. Each bolt 379 engages the fixing hole 357 after each supporting pivot 356 is received in the connecting hole 361, such that two third transmission bars 36 are movably connected to the connecting plate 35.

Referring to FIG. 2, during assembly of the parallel robot 100, the bearing 311 is positioned in the shaft hole 322 of the rotating portion 325. The clasp 313 is positioned in the shaft hole 322 to secure the bearing 311. The rotating portion 325 sleeves on the rotary shaft 13 of the base plate 10, such that the rotary shaft 13 passes through the bearing 311 and the clasp 313. The clip spring 315 sleeves on the rotary shaft 13, thus the rotating portion 325 cannot detach from the rotary shaft 13. Two first transmission bars 32 of the driving bar assembly 31 can rotate about two rotary shafts 13, respectively, such that the kinematic chain 30 is rotatably connected to the base plate 10.

Each third pivot 48 passes through one of two connecting holes 346, the through hole 47, the other one of two connecting holes 346, and engages the nut 49, such that each second transmission bar 34 is movably connected to the mobile platform 40. Each bolt 44 engages the fixing hole 45 after the rotary pivot 43 is received in the connecting hole 361, such that each third transmission bar 36 is movably connected to the mobile platform 40. The second transmission bar 34 can rotate about the third pivot 48, and the third transmission bar 36 can rotate about the rotary pivot 43, such that the kinematic chain 30 is rotatably connected to the mobile platform 40.

Two first actuators 20 are fixed to the base plate 10 adjacent to two rotary shafts 13, and each gear 23 meshing with two dentate structures 324 of two rotating portions 325, due to the two center distances between the gear 23 and each rotary shaft 13 being equal. The second actuator 60 is fixed to the base plate 10. The rotary linkage shaft 50 is rotatably connected to the base plate 10 with an end passing through the mounting hole 15, and the rotary linkage shaft 50 is rotatably connected to the mobile platform 40 with the other end passing through the mounting hole 41, thus yielding the parallel robot 100 shown in FIG. 1.

In operation, each first actuator 20 rotates the driving bar assembly 31 of the kinematic chain 30 about two rotary shafts 13 simultaneously, such that the driven bar assembly 33 is moved, and the mobile platform 40 is moved in a reciprocating way relative to the base plate 10. The rotary linkage shaft 50 is rotated along its axis by the second actuator 60, and the rotary linkage shaft 50 can swing because its end is rotatably connected to the mobile platform 40. The mobile platform 40 can further includes manipulators connected to the rotary linkage shaft 50, such that the parallel robot 100 can perform various tasks, such as grasping, cutting, or drilling a workpiece.

In the parallel robot 100, each first actuator 20 drives two rotating portions 325 of the driving bar assembly 31 to rotate in the same direction simultaneously, thus increasing the positioning precision and structural stability of the parallel robot 100. In addition, a self-rotation of the mobile platform 40 is limited by the two parallel first transmission bars 32 and two third transmission bars 36 arranged substantially perpendicular to the movable plane of the kinematic chain 30, thus increasing the stability of the parallel robot 100.

It is to be understood that, in alternative embodiments, the kinematic chain 30 may have one, three, or four third transmission bars 36. The first, second, and third transmission bars 32, 34, and 36 may be connected to the connecting plate 35 by other means, such as hinges. The bearing 311, the clasp 313, and the clip spring 315 may all be omitted.

It is to be understood that, in alternative embodiments, the parallel robot 100 can include two transmission belts connecting the first actuator 20 and two rotating portions 325 of the driving bar assembly 31, whereby the first actuator 20 rotates two rotating portions 325 of the driving bar assembly 31 in the same direction simultaneously.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A parallel robot, comprising:
   a base plate;
   two first actuators located on the base plate;
   a mobile platform; and
   two kinematic chains respectively interconnecting the base plate and the mobile platform, each of the two kinematic chains comprising:
   a driving bar assembly connected to one of the two first actuators, the driving bar assembly comprising two substantially parallel first transmission bars, each of the two first transmission bars comprising a rotating portion rotatably connected to the base plate; and
   a driven bar assembly interconnecting the driving bar assembly and the mobile platform, wherein the rotating portion forms a dentate structure on a margin thereof, and each of the two first actuators comprises a gear meshing with the dentate structure of the rotating portion, each of the two first actuators drives two rotating portions of the two first transmission bars to rotate in the same direction simultaneously.

2. The parallel robot of claim 1, wherein the base plate forms four substantially parallel rotary shafts extending from a side surface thereof, the rotating portion defines a shaft hole to receive one of the four rotary shafts; the gear is adjacent to the corresponding two of the four rotary shafts; and a distance between an axis of the gear and an axis of one of the two rotary shafts equals that between the axis of the gear and an axis of another adjacent rotary shaft.

3. The parallel robot of claim 2, wherein the distance between the axis of the gear and the axis of one of the two rotary shafts is shorter than that between the two axes of the two rotary shafts.

4. The parallel robot of claim 2, wherein the kinematic chain further comprises a bearing in the shaft hole and sleeved on the rotary shaft.

5. The parallel robot of claim 4, wherein the kinematic chain further comprises a clasp in the shaft hole sleeved on the rotary shaft to secure the bearing.

6. The parallel robot of claim 5, wherein the kinematic chain further comprises a clip spring in the shaft hole sleeved on the rotary shaft, wherein the clip and the clasp are on the two sides of the bearing.

7. The parallel robot of claim 1, wherein a plane defined by two first transmission bars is substantially parallel to a movable plane of the kinematic chain.

8. The parallel robot of claim 1, wherein the kinematic chain further comprises a connecting plate movably interconnecting the driving bar assembly and the driven bar assembly.

9. The parallel robot of claim 8, wherein each first transmission bar of the driving bar assembly comprises a connecting portion movably connected to the connecting plate; and each driven bar assembly comprises a second transmission bar and at least one third transmission bar movably interconnecting the connecting plate and the mobile platform.

10. The parallel robot of claim 9, wherein each driven bar assembly comprises two substantially parallel third transmission bars; and a plane defined by the two third transmission bars is substantially perpendicular to a movable plane of the kinematic chain.

11. The parallel robot of claim 10, wherein the third transmission bar is the same length as the second transmission bar.

12. The parallel robot of claim 1, further comprising a second actuator on the base plate, and a rotary linkage shaft interconnecting the base plate and the mobile platform; wherein the second actuator rotates the rotary linkage shaft relative to the base plate.

* * * * *